United States Patent [19]
Wakita et al.

[11] Patent Number: 4,675,143
[45] Date of Patent: Jun. 23, 1987

[54] PROCESS FOR PRODUCING A SHAPED ELECTROCONDUCTIVE THERMOPLASTIC RESIN COMPOSITION ARTICLE

[75] Inventors: Kazuto Wakita; Kazuo Tsuchiya; Kazuaki Kobayashi, all of Sakai; Ken Higashitsuji, Kyoto; Teruhisa Kojima, Takarazuka, all of Japan

[73] Assignees: Ube Industries, Ltd., Yamaguchi; Marubishi Oil Chemical Co., Ltd., Osaka, both of Japan

[21] Appl. No.: 814,184

[22] Filed: Dec. 27, 1985

[30] Foreign Application Priority Data

Dec. 28, 1984 [JP] Japan ................. 59-274497

[51] Int. Cl.$^4$ ............................................. C04B 35/00
[52] U.S. Cl. .................... 264/104; 264/176.1; 264/211; 264/211.21; 264/328.18; 264/349
[58] Field of Search ............ 264/104, 108, 211, 176 F, 264/176.1, 328.18, 349, 211.21

[56] References Cited

U.S. PATENT DOCUMENTS 3,194,860  7/1965  Ehrreich ............................ 264/104
3,725,521  4/1973  Ebling ............................... 264/104

FOREIGN PATENT DOCUMENTS 0176220 10/1983 Japan .
0094618  5/1984 Japan ............................... 264/104

Primary Examiner—Jan H. Silbaugh
Assistant Examiner—Harold Pyon
Attorney, Agent, or Firm—Burgess, Ryan and Wayne

[57] ABSTRACT

A shaped electroconductive thermoplastic resin composition article having a preferable surface appearance is produced by a process including (1) mixing a matrix resinous material containing 100 parts by weight of a thermoplastic resin and, optionally, 120 parts by weight or less of a flame x retardant additive and 40 parts by weight or less of a flame retardant synergistic additive, with 1 to 15% based on the weight of the matrix resinous material, of stainless steel fibers having a length of 2.5 to 7.5 mm and adhered to each other with a thermoplastic resinous adhesive to form a number of bundles; (2) kneading the resultant mixture at an elevated temperature at which the matrix resinous material is melted and (3) shaping the kneaded mixture into a desired form, the kneading the shaping procedures being carried out so that the stainless steel fibers are uniformly dispersed in the melted matrix resinous material and the dispersed stainless steel fibers have an average length of 0.5 to 2.0 mm. The ratio of the average length of the dispersed and sheared stainless steel fibers to the length of the stainless steel fiber bundles is preferably in a range of 1/6 to ⅓.

12 Claims, No Drawings

PROCESS FOR PRODUCING A SHAPED ELECTROCONDUCTIVE THERMOPLASTIC RESIN COMPOSITION ARTICLE

BACKGROUND OF THE INVENTION

1. Field of the Invention

The present invention relates to a process for producing a shaped electroconductive thermoplastic resin composition article. More particularly, the present invention relates to a process for producing a shaped electroconductive thermoplastic resin composition article, which article has a high electroconductivity, a satisfactory mechanical strength, and a high electromagnetic wave-shielding property.

2. Description of the Related Art

It is known that various electronic devices equipped in cars or home electric appliances sometimes radiate high or low frequency waves and that the radiated electromagnetic waves cause undesirable interference with effective radio waves.

For the purpose of preventing this undesirable interference, electronic devices have been covered by a metal plate or box to stop the radiation of electromagnetic waves from the devices.

Recently, the trend has been to replace the metal plate or box with a thermoplastic resin container. In a conventional electromagnetic wave-shielding thermoplastic resin container, the surface of the container is coated with an electroconductive substance to shield the undesirable electromagnetic waves. However, the coating is not satisfactorily durable and is usually expensive.

Accordingly, it has been attempted to blend and disperse an electroconductive filler, for example, carbon black, carbon fibers, metal powder, metal flakes, or metal fibers, into a thermoplastic resin matrix to provide an electroconductive resin composition for the electromagnetic wave-shielding container.

Usually, in the preparation of the electroconductive resin composition, a large amount of the electroconductive filler is used to enhance the electroconductivity and the electromagnetic wave-shielding property of the resultant shielding container. This large amount of electroconductive filler causes the resultant shielding container to exhibit poor mechanical strength and reduced thermoplasticity and shaping property.

In another attempt, metal fibers are blended into a thermoplastic resin matrix to provide an electroconductive resin composition. In the resin composition, the electroconductivity thereof increases with an increase in the length of the metal fibers. However, the excessively long metal fibers frequently result in formation of undesirable fiber balls in the resultant composition and in difficulty in uniformly dispersing the metal fibers in the resin matrix. Also, the excessively long metal fibers are easily broken while the resin composition is produced by a kneading procedure. The breakage of the long metal fibers results in reduced electroconductivity of the resultant resin composition and in a poor electromagnetic wave-shielding property of the resultant shielding container.

In still another attempt, Japanese Unexamined Patent Publication (Kokai) No. 58-176220 discloses a process for producing an electroconductive plastic composition. In this process, a number of metal fiber bundles having a length of 1 to 15 mm are blended with a plastic resin and the blend is kneaded. The kneading operation is carried out in such a manner that the length of the metal fibers is not substantially reduced.

The above-mentioned kneading procedure is, however, unsatisfactory for uniformly distributing the metal fibers in the plastic resin. Therefore, in order to obtain a desired electroconductivity of the resultant composition, a relatively large amount of the metal fibers should be blended with the plastic resin.

SUMMARY OF THE INVENTION

An object of the present invention is to provide a process for producing a shaped electroconductive thermoplastic resin composition article, which contains a relatively small amount of stainless steel fibers and exhibits excellent electroconductivity.

Another object of the present invention is to provide a process for producing a shaped electroconductive thermoplastic resin composition article, which has an excellent electromagnetic wave-shielding property and satisfactory surface appearance.

The above-mentioned object is attained by the process of the present invention, which comprises the steps of mixing a matrix resinous material containing a thermoplastic resinous material with 1 to 15%, based on the weight of the matrix resinous material, of stainless steel fibers having a length of 2.5 to 7.5 mm and in the form of a number of bundles in which the stainless steel fibers are adhered to each other with a thermoplastic resin adhesive; kneading the resultant mixture at an elevated temperature at which the matrix resinous material is melted; and shaping the resultant kneaded resin composition into a desired form, the kneading and shaping steps being carried out to an extent that the stainless steel fibers are released from the bundles, are uniformly dispersed in the melted matrix resinous material, and are sheared into an average length of from 0.5 to 2.0 mm.

The ratio of the average length of the dispersed and sheared stainless steel fibers to the length of the stainless steel fiber bundles is preferably in a range of from 1/6 to ⅓.

DESCRIPTION OF THE PREFERRED EMBODIMENTS

In the first step of the process of the present invention, a matrix resinous material is mixed with 1 to 15%, based on the weight of the matrix resinous material, of a number of stainless steel fibers.

The matrix resinous material contains a thermoplastic resin and, optionally, an additive. The thermoplastic resin usable for the present invention is not limited to a specific type of resinous material and preferably comprises at least one molding resin selected from the group consisting of polyamides, for example, nylon 6, nylon 66, nylon 11, and nylon 12, acrylonitrile-butadiene-styrene copolymers (ABS), polypropylene, polyesters, high impact polystyrene compositions, polycarbonates, and polyphenylene oxide The matrix resinous material may contain an additive in addition to the thermoplastic resin. The additive preferably contains 120 parts by weight or less, more preferably 5 to 100 parts, still more preferably 40 to 60 parts, of a flame retardant additive per 100 parts by weight of the thermoplastic resin. The additive may further contain, in addition to the flame retardant additive, 40 parts by weight or less, preferably 30% by weight or less, of a flame retardant synergistic additive per 100 parts by weight of the thermoplastic resin.

The flame retardant additive and the flame retardant synergistic additive are effective for enhancing the flame retardant property of the resultant electroconductive thermoplastic resin composition.

In the electroconductive thermoplastic resin composition, which contains the stainless steel fibers, it is preferable that the flame retardant additive comprise at least one flame retardant decabromodiphenyl compound. The decabromodiphenyl compound is preferably selected from decabromodiphenyl ether and decabromodiphenyl. The flame retardant synergistic additive preferably consists of antimony trioxide.

The combination of the decabromodiphenyl compound-containing flame retardant additive with the stainless steel fibers is highly effective for promoting the flame retardant property of the resultant composition. The amounts of the flame retardant additive and the flame retardant synergistic additive should be limited to the levels as mentioned above. Even if the flame retardant additive and the flame retardant synergistic additive are used in excessive amounts over the above-mentioned upper limits, that is, 120 parts and 40 parts per 100 parts by weight of the thermoplastic resin, it is not expected to obtain an increase in the flame-retardant property of the resultant composition. Also, the excessive amounts of the additives result in decreased mechanical properties of the resultant composition.

The stainless steel fibers usable for the present invention have a length of 2.5 to 7.5 mm, preferably 3.0 to 7.0 mm, and are in the form of a number of bundles in which the stainless steel fibers are adhered to each other with a thermoplastic resinous adhesive.

The stainless steel fibers preferably have a thickness (diameter) of 2 to 20 µm, more preferably, 2 to 15 µm. Also, each bundle preferably consists of 1,000 to 50,000 stainless steel fibers. In the bundles, the stainless steel fibers are arranged in parallel to each other and adhered to each other with an adhesive. The thermoplastic resinous adhesive is not limited to a specific type of adhesive. However, the thermoplastic resinous adhesive preferably comprises at least one solvent-soluble adhesive polymer selected from vinyl acetate copolymers, for example, ethylene-vinyl acetate copolymers, and saturated polyester copolymers.

In the bundles, the amount of the thermoplastic resinous adhesive is preferably in the range of from 1% to 20%, based on the weight of the bundles.

In the preparation of the bundles, a tow consisting of a desired number of the stainless steel fibers is impregnated with a solution or emulsion of a thermoplastic resinous adhesive, is dried to solidify the adhesive, and is cut into a desired length.

If the length of the stainless steel fiber bundles is less than 2.5 mm, the resultant shaped article exhibits an unsatisfactory electroconductivity. Also, a larger length of the stainless steel fiber bundles than 7.5 mm causes an uneven mixture of the bundles and the thermoplastic resin and formation of a number of fiber balls during the kneading and shaping steps. This phenomenon results in undesirable clogging of a molding nozzle.

The stainless steel fiber bundles are added in an amount of from 1% to 15%, preferably 5% to 10%, based on the weight of the matrix resinous material.

When the amount of the fiber bundles is less than 1%, the resultant shaped article exhibits a poor electroconductivity. Also, an excessive amount of the stainless steel fibers over 15% is substantially not effective for enhancing the electroconductivity of the resultant shaped article. Also, stainless steel fibers in an excessively large amount over 15% are difficult to be evenly dispersed in the matrix resinous material.

The matrix resinous material containing the thermoplastic resin and, optionally, the flame retardant additive and the flame retardant synergistic additive is preferably in the form of pellets. In the mixing step, the pellets may be mixed with the stainless steel fiber bundles. However, it is preferable that the matrix resinous material be melted and the stainless steel fiber bundles be mixed with the melt of the matrix resinous material.

In the second step of the process of the present invention, the mixture of the matrix resinous material with the stainless steel fiber bundles is kneaded at an elevated temperature at which the matrix resinous material is melted without thermally decomposing.

The kneading procedure can be carried out by any type of kneading method and apparatus. The kneaded mixture is usually pelletized and then is subjected to the next shaping step.

In the third step of the process of the present invention, the kneaded mixture is shaped or molded into a desired form, for example, a box form. The shaping or molding procedure is usually carried out by injection molding procedures.

The kneading and shaping procedures are carried out to an extent that the stainless steel fibers are released from the bundles, are uniformly dispersed in the melted matrix resinous material, and are sheared into an average length of from 0.5 to 2.0 mm, preferably from 0.5 to 1.5 mm. It is necessary that the resultant shaped article be free from stainless steel fiber balls and have a good appearance.

It is preferable that the ratio of the average length of the dispersed and sheared stainless steel fibers to the length of the stainless steel fiber bundles be in a range of from 1/6 to ⅓.

When the average length of the dispersed stainless steel fibers is less than 0.5 mm, the resultant shaped article exhibits poor electroconductivity. Also, if the average length of the dispersed stainless steel fibers is more than 2.0 mm, the resultant shaped article exhibits saturated electroconductivity and electromagnetic wave-shielding property.

The thermoplastic resin composition may further contain an additional electroconductive material, for example, metal powder, metal flakes, carbon black, carbon fibers, or metal-coated inorganic filler particles, if necessary. The composition may contain another additive, for example, a lubricant, plasticizer, antioxidant, or an ultraviolet ray-absorbing agent, if necessary.

The shaped article of the present invention is usually in the form of a plate, sheet, for example, slat or thin film, tube, box, bag, covering material, or container. The shaped article can be produced by means of injection molding, extruding, compression molding, or foam molding.

The present invention will be illustrated in detail by the following examples and comparative examples.

EXAMPLE 1

Polypropylene resin pellets were mixed with 10%, based on the weight of the pellets, of stainless steel fiber bundles, each having a length of 5 mm and each consisting of 10,000 stainless steel fibers each having a diameter of 8 µm and adhered to each other with 10%, based on the weight of the stainless steel fiber bundles, of a vinyl acetate-containing copolymer adhesive (under the trademark of X-Link made by Kanebo Ltd.). The stainless steel fibers were available under the trademark of Naslon TOW 316L and were made by Nippon Seisen K.K.

The mixture was kneaded in a kneader at a temperature of 180° C. at a kneading rotation velocity of 24 rpm for 5 minutes. The resultant kneaded composition was converted into pellets.

The composition pellets were subjected to an injection molding procedure by using a Toshiba 10 OZ type molding machine to produce a plate having a length of 15 cm, a width of 15 cm, and a thickness of 3 mm. In the plate, the dispersed stainless steel fibers had an average length of 1.2 mm.

The surface of the plate was completely free from stainless steel fiber balls and was smooth. The plate exhibited an electroconductivity corresponding to an inherent volume resistivity of $5.5 \times 10^{-1}$ cm and a shielding effect of 53 dB at 500 MHz.

EXAMPLE 2

The same procedures as those described in Example 1 were carried out, except that in each stainless steel fiber bundle, 10,000 stainless steel fibers each having a length of 5 mm and a diameter of 8 $\mu$m were adhered to each other with 5%, based on the weight of the bundles, of an ethylene-vinyl acetate copolymer adhesive (under a trademark of Sumitate KA-10, Sumitomo Chemical Co.) and the kneading procedure was carried out at a temperature of 180° C. at a kneading rotation velocity of 24 rpm for 3 minutes.

The composition was converted into a plate in the same manner as that described in Example 1. The resultant plate contained therein uniformly dispersed stainless steel fibers having an average length of 1.0 mm, was completely free from stainless steel fiber balls, and exhibited a satisfactory electroconductivity corresponding to an inherent volume resistivity of $8.0 \times 10^{-1}$ cm and a shielding effect of 50 dB at 500 MHz.

EXAMPLE 3

The same procedures as those mentioned in Example 1 were carried out except that the stainless steel fiber bundles contained 10%, based on the weight of the bundles, of a saturated polyester resin adhesive (under a trademark of Elitel UE-3210 made by Unitika, Ltd.) and the kneading procedure was carried out at a temperature of 180° C. at a kneading rotation velocity of 24 rpm for 6 minutes.

The resultant molded plate contained therein uniformly dispersed stainless steel fibers having an average length of 0.9 mm, was free from stainless steel fiber balls, had a satisfactory appearance, and exhibited an inherent volume resistivity of $9.2 \times 10^{-1}$ cm and a shielding effect of 48 dB at 500 MHz.

COMPARATIVE EXAMPLE 1

The same procedures as those described in Example 1 were carried out, except that the stainless steel fiber bundles were replaced by nonbundled stainless steel fibers each having a length of 5 mm and a diameter of 8 $\mu$m and the kneading procedure was carried out at a temperature of 180° C. at a kneading rotation velocity of 24 rpm for 5 minutes.

In the resultant composition, it was impossible to determine the average length of the stainless fibers because of the formation of a number of stainless steel fiber balls.

The resultant plate contained a number of stainless steel fiber balls located on the surface thereof, had an unsatisfactory appearance, and exhibited a large inherent volume resistivity of more than $10^6$ $\Omega$cm.

COMPARATIVE EXAMPLE 2

The same procedures as those described in Comparative Example 1 were carried out, except that the kneading procedure was effected at a temperature of 180° C. at a kneading rotation velocity of 24 rpm for 60 minutes.

The resultant molded plate contained dispersed stainless steel fibers having an average length of 0.2 mm, had a smooth surface thereof free from fiber balls, and exhibited a poor electroconductivity corresponding to an inherent volume resistivity of more than $10^6$ $\Omega$cm.

COMPARATIVE EXAMPLE 3

The same procedures as those described in Example 1 were carried out, except that the stainless steel fiber bundles had a length of 10 mm.

The resultant molded plate contained dispersed stainless steel fibers having an average length of 0.4 mm, and exhibited an unsatisfactorily high inherent volume resistivity of $2 \times 10^3$ $\Omega$cm.

COMPARATIVE EXAMPLE 4

The same procedures as those described in Example 1 were carried out, except that the kneading procedure was conducted at a temperature of 180° C. at a kneading rotation velocity of 24 rpm for 2 minutes.

When the composition pellets were subjected to the injection molding procedure, it was found that the injection nozzle was frequently blocked and therefore the molding procedure was frequently interrupted.

In the resultant plate, the dispersed stainless steel fibers had an average length of 2.4 mm.

EXAMPLE 4

A flame retardant polypropylene composition was prepared by blending 100 parts by weight of a polypropylene resin with 56 parts by weight of decabromodiphenylether (under a trademark of DP-10F made by Marubishi Oil Chemical Co.) and 24 parts by weight of antimony trioxide. The resultant composition was pelletized.

The flame retardant polypropylene composition pellets were mixed with 10%, based on the weight of the pellets, of the same stainless steel fiber bundles as those described in Example 1.

The mixture was kneaded in a kneader at a temperature of 180° C. at a kneading rotation velocity of 24 rpm for 5 minutes, and the resultant kneaded composition was pelletized. The pellets were converted to a plate (15 cm $\times$ 15 cm $\times$ 3 mm) by the same molding procedure as that described in Example 1.

In the resultant plate, the dispersed stainless steel fibers had an average length of 1.3 mm.

In appearance, the resultant plate was completely free from stainless steel fiber balls. Also, the plate exhibited an inherent volume resistivity of $3.8 \times 10^{-1}$ $\Omega$cm, shielding effect of 59 dB at 500 MHz, and a flame-retarding effect of V-O determined in accordance with UL-94.

EXAMPLES 5 and 6

In each of Examples 5 and 6, the same procedures as those described in Example 4 were carried out, except that in Example 5, the same stainless steel fiber bundles as those described in Example 2 were used and, in Example 6, the same stainless steel fiber bundles as those described in Example 3 were used.

In the resultant plates, the dispersed stainless steel fibers had an average length of 1.2 mm in Example 5 and 1.1 mm in Example 6, and no stainless steel fiber ball was found on the surfaces thereof.

The plate of Example 5 exhibited an inherent volume resistivity of $5.5 \times 10^{-1}$ Ωcm, a shielding effect of 50 dB or more at 500 MHz, and a flame retarding effect of V-O.

EXAMPLE 7

The plate of Example 6 exhibited an inherent volume resistivity of $6.3 \times 10^{-1}$ Ωcm, a shielding effect of 50 dB or more at 500 MHz, and a flame retarding effect of V-O.

EXAMPLE 7

The same procedures as those described in Example 1 were carried out, except that the polypropylene resin was replaced by an ABS resin, the kneading procedure was carried out at a temperature of 180° C. at a kneading rotation velocity of 24 rpm for 6 minutes, and the injection molding procedure was carried out at a resin temperature of 230° C.

In the resultant plate, the dispersed stainless steel fibers had an average length of 1.1 mm.

The resultant molded plate did not include stainless steel fiber balls and exhibited an inherent volume resistivity of $6 \times 10^{-1}$ Ωcm and a shielding effect of 53 dB at 500 MHz.

As clearly illustrated in Examples 1 to 7, the thermoplastic resin composition of the present invention exhibits an excellent electroconductivity and electromagnetic wave-shielding effect in spite of the fact that the content of the electroconductive stainless steel fibers is relatively small.

We claim:

1. A process for producing a shaped electroconductive thermoplastic resin compostion article comprising the steps of:
    mixing a matrix resinous material containing a thermoplastic resin with 1 to 15%, based on the weight of the matrix resinous material, of stainless steel fibers having a length of 2.5 to 7.5 mm and in the form of a number of bundles in which the stainless steel fibers are adhered to each other with a thermoplastic resin adhesive; and
    kneading the resultant mixutre at an elevated temperature at which the matrix resinous material is melted; and
    shaping the resultant kneaded mixture into a desired form,
    said kneading and shaping procedures being carried out to an extent that the stainless steel fibers are released from the bundles, are uniformly dispersed in the melted matrix resinuous maerial and are sheared into a decreased average length of from 1/6 to ⅓ of the original length of the stainless steel fiber bundles and having a length of from 0.5 to 2.0 mm.

2. The process as claimed in claim 1, wherein the thermoplastic resin adhesive is in an amount of from 1% to 20% based on the weight of the stainless steel fiber bundles.

3. The process as claimed in claim 1, wherein the thermoplastic resin adhesive comprises at least one polymer selected from the group consisting of vinyl acetate-containing copolyemrs and saturated polyester copolymers.

4. The process as claimed in claim 1, wherein the stainless steel fibers have a thickness of 2 to 20 microns.

5. The process as claimed in claim 1, wherein each stainless steel fiber bundle includes 1,000 to 50,000 stainless steel fibers.

6. The process as claimed in claim 1, wherein the thermoplastic resin comprises at least one molding resin selected from the group consisting of nylon 6, nylon 66, nylon 11, nylon 12, acrylonitrile-butylene-styrene copolymers, polypropylene, polyesters, high impact polystyrene compositions, polycarbonates, and polyphenylene oxide.

7. The process as claimed in claim 1, wherein the matrix resinous material further contains 120 parts by weight or less of a flame retardant additive per 100parts by weight of the thermoplastic resin.

8. The process as claimed in claim 6, wherein the flame retardant additive comprises at least one flame retardant decabromodiphenyl compound.

9. The process as claimed in claim 8, wherein the flame retardant decabromodiphenyl compound is selected from the group consisting of decabromodiphenylether and decabromodiphenyl.

10. The process as claimed in claim 7, wherein the matrix resinous material still further contains 40 parts by weight or less of a flame retardant synergistic additive per 100 parts by weight of the thermoplastic resin.

11. The process as claimed in claim 10, wherein the flame retardant synergistic additive comprises antimony trioxide.

12. The process as claimed in claim 1, wherein in the mixing procedure, the matrix resinous material is in the form of pellets.

* * * * *